United States Patent [19]

Whitener

[11] 4,450,661
[45] May 29, 1984

[54] COMPOSITE STRUCTURES WINDOW BELT AND METHOD OF MAKING

[75] Inventor: Philip C. Whitener, Seattle, Wash.

[73] Assignee: The Boeing Company, Seattle, Wash.

[21] Appl. No.: 318,642

[22] PCT Filed: Sep. 30, 1981

[86] PCT No.: PCT/US81/01321
§ 371 Date: Sep. 30, 1981
§ 102(e) Date: Sep. 30, 1981

[87] PCT Pub. No.: WO83/01237
PCT Pub. Date: Apr. 14, 1983

[51] Int. Cl.³ .................. B64C 1/14; E06B 3/20; E06B 3/26; B31D 3/02
[52] U.S. Cl. .................. 52/206; 52/202; 52/208; 52/309.1; 52/309.13; 52/309.16; 52/455; 52/656; 52/657; 52/787; 52/788; 244/120
[58] Field of Search ............ 52/202, 206, 208, 309.1, 52/309.13, 309.16, 455, 656, 657, 787, 788; 244/120, 129.3

[56] References Cited

U.S. PATENT DOCUMENTS

| | | | |
|---|---|---|---|
| 2,504,204 | 4/1950 | Kiefer | 52/202 X |
| 2,767,443 | 10/1956 | Hofein et al. | 52/788 X |
| 2,989,787 | 6/1961 | Smith | 52/208 X |
| 3,356,403 | 12/1967 | Sak et al. | 52/656 X |
| 3,429,530 | 2/1969 | Hertel | 244/129.3 |

FOREIGN PATENT DOCUMENTS

| | | | |
|---|---|---|---|
| 1100917 | 3/1961 | Fed. Rep. of Germany | 52/202 |
| 1555631 | 1/1978 | Fed. Rep. of Germany | 32/309.1 |
| 1304064 | 8/1962 | France | 52/656 |
| 1398268 | 6/1975 | United Kingdom | 52/788 |

Primary Examiner—Alfred C. Perham
Attorney, Agent, or Firm—Morris A. Case; B. A. Donahue

[57] ABSTRACT

A composite structure window belt has a roll of the lined reinforced plastic window frames set between honeycomb core and covered top and bottom with a reinforced plastic cover. The window frames have built-in reinforcements to accept fasteners for securing windows within the diamond-shaped openings.

7 Claims, 13 Drawing Figures

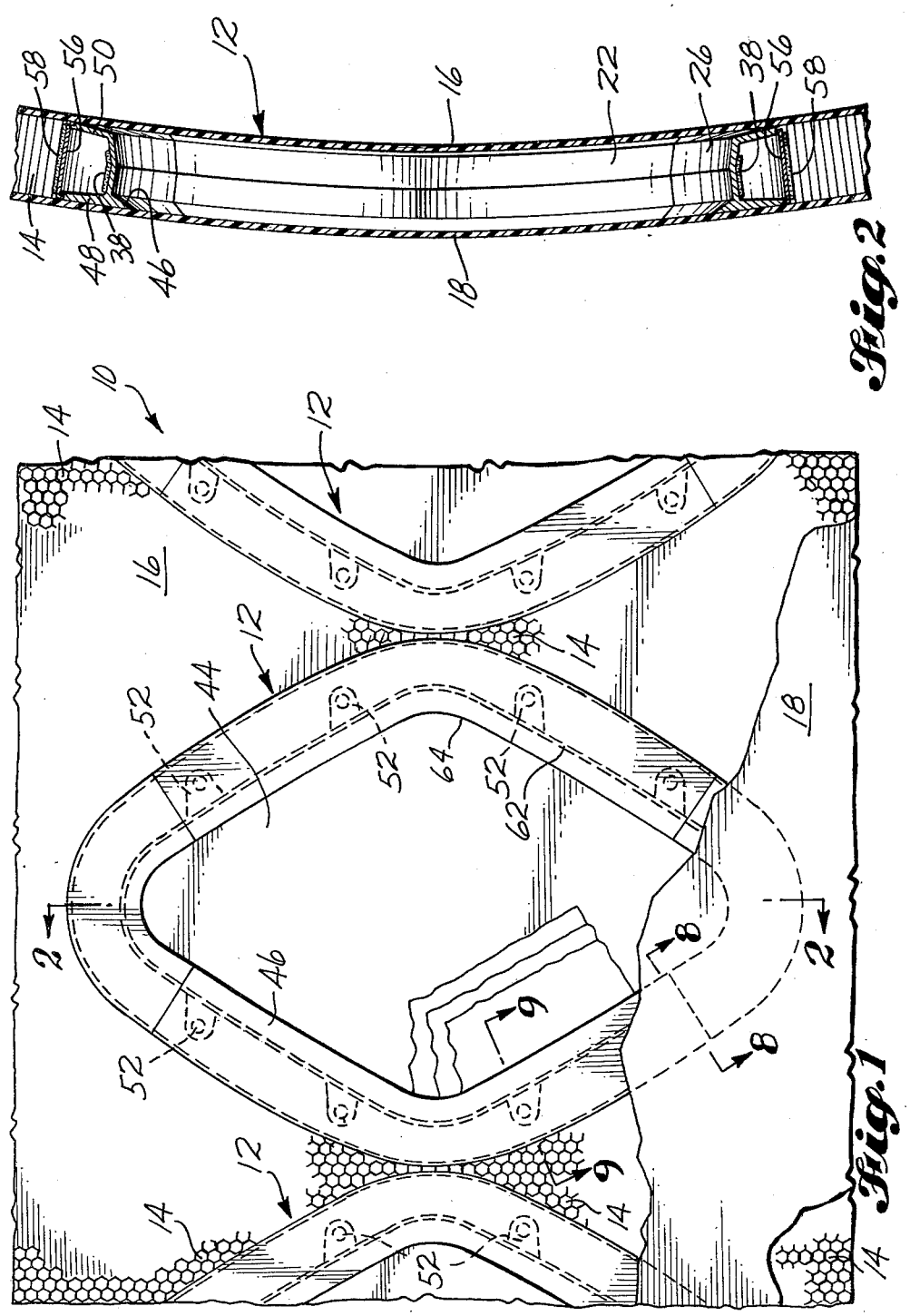

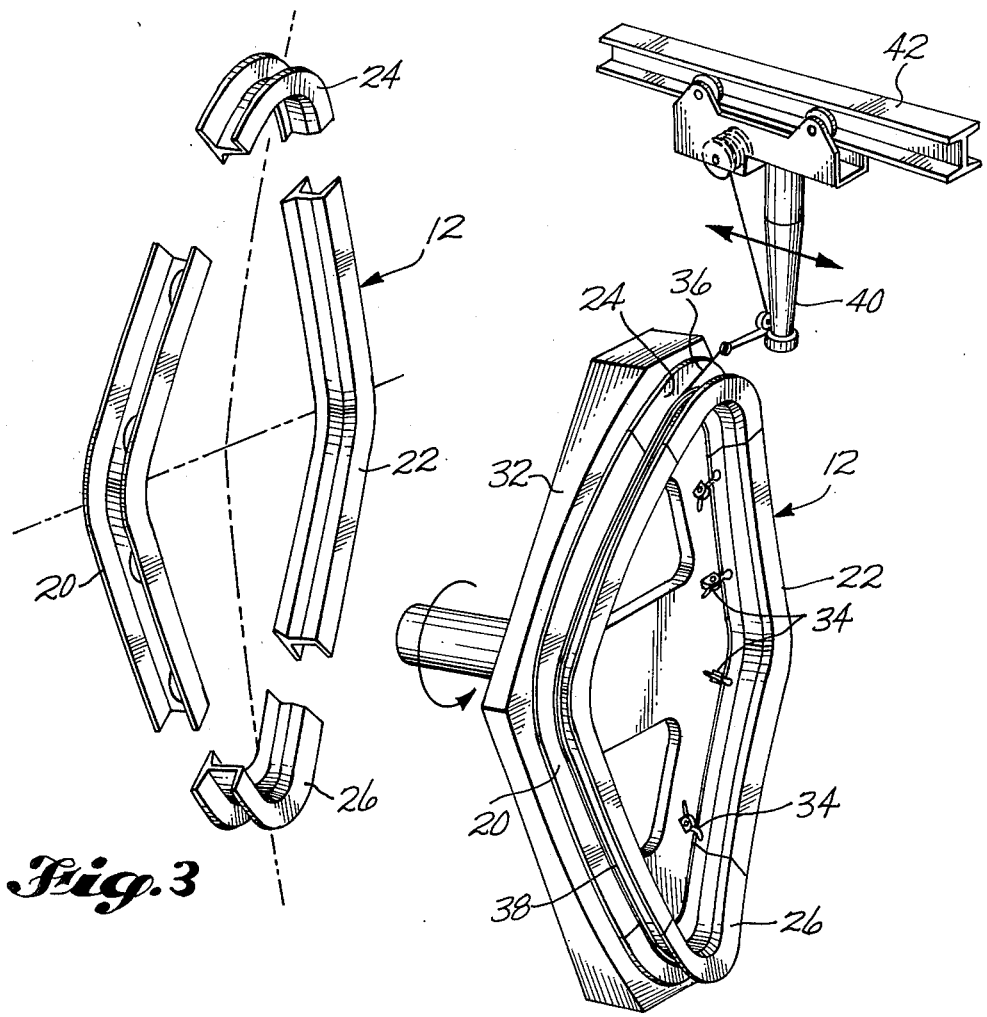
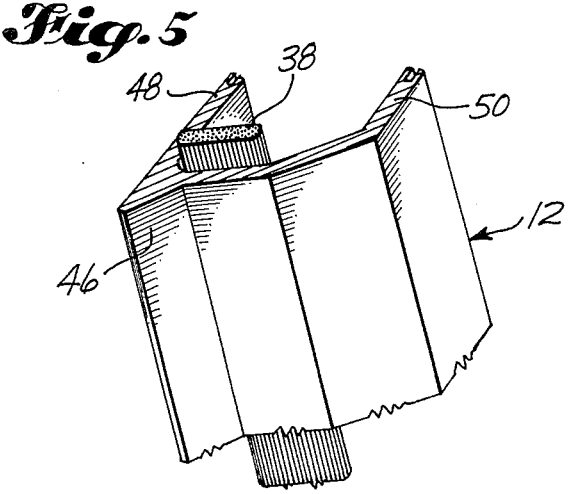

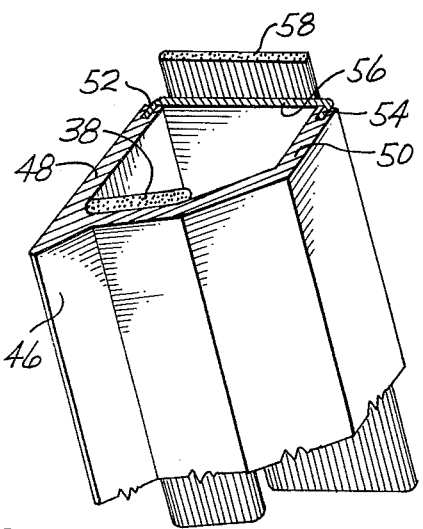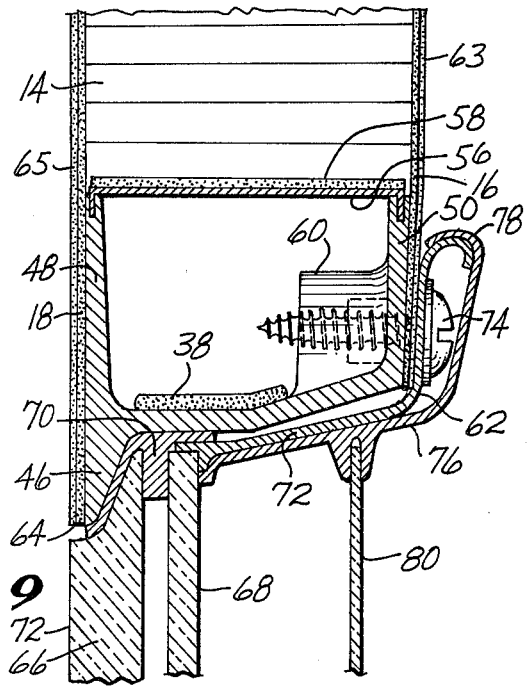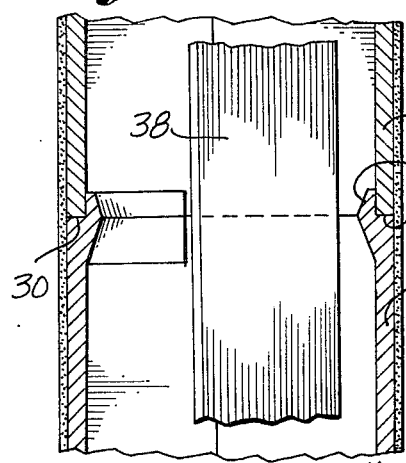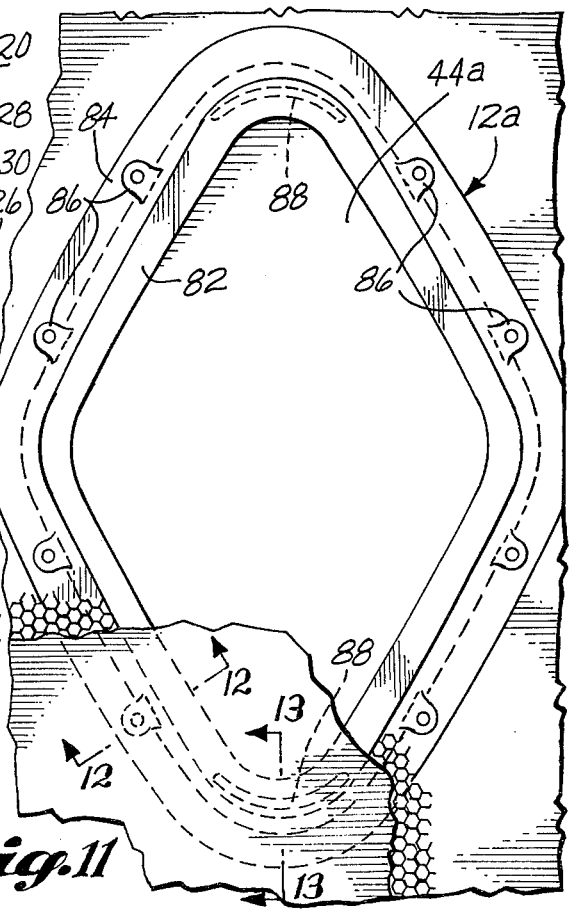

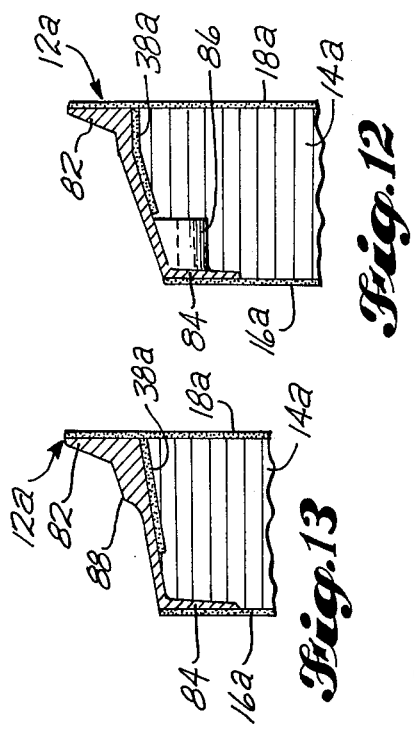
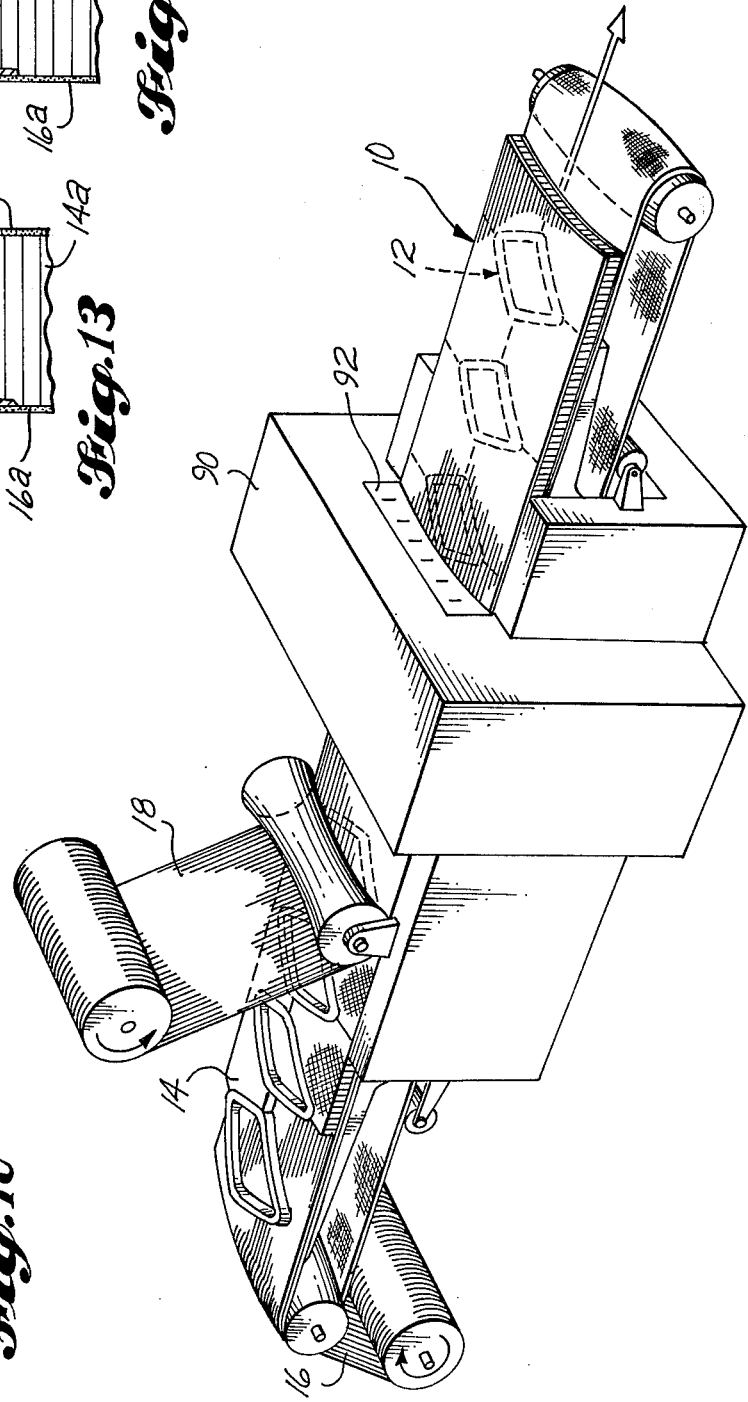

COMPOSITE STRUCTURES WINDOW BELT AND METHOD OF MAKING

BACKGROUND OF THE INVENTION

The use of reinforced plastics in composite structures has been increasing rapidly in the aircraft industry due to the high strength to weight ratio of the composite. The composites often must be tied by mechanical fasteners in order to transfer loads from the composite to metallic structures. These fasteners weaken the structure and add weight and increase manufacturing costs.

It was found that a composite structure window belt could be made that has all but eliminated the need for fasteners.

SUMMARY OF THE INVENTION

Reinforced plastic window frames have an essentially diamond-shaped window opening. The window frame has a flange extending into the opening adjacent the outside of the window and an outwardly extending flange having a series of reinforcements for receiving glass retainers adjacent the inside of the window. The window frames are placed in a line with honeycomb core between and around the frames. A reinforced plastic covering is placed above and below the window frames and the core material and cured into a composite structure window belt.

DESCRIPTION OF THE DRAWINGS

FIG. 1 shows a fragmented plan view of a window belt of this invention.

FIG. 2 shows a section taken along line 2—2 of FIG. 1.

FIG. 3 shows an exploded perspective view of the window frame shown as part of FIG. 1.

FIG. 4 shows a perspective view of the window frame of FIG. 1 with the parts joined together, mounted on a mandrel, and filaments being wound around the frame.

FIG. 5 shows a fragmented perspective view of a section of the window frame with fibers wound around it as in FIG. 4.

FIG. 6 shows a similar fragmented perspective view of a section of the window frame with an additional reinforcement with fibers wound around it.

FIG. 7 shows a cross section taken along the line 7—7 of FIG. 8.

FIG. 8 shows a cross section taken along the line 8—8 of FIG. 1.

FIG. 9 shows a cross section with window taken along the line 9—9 of FIG. 1.

FIG. 10 shows a perspective view showing the window belt being formed and cured.

FIG. 11 shows a plan view of a section of window belt with a different embodiment for the window frame.

FIG. 12 shows a cross section taken along the line 12—12 of FIG. 11.

FIG. 13 shows a cross section taken along the line 13—13 of FIG. 11.

DETAILED DESCRIPTION

A composite structure window belt 10 is made up of a series of reinforced plastic window frames 12, honeycomb core material 14, an inner reinforced plastic cover 16 and an outer reinforced plastic cover 18. Each window frame, as is best shown in FIGS. 3 through 9, is made up of molded reinforced plastic parts 20, 22, 24 and 26. These parts are molded from any of the known reinforced plastics with graphite filaments and epoxy resin the preferred combination. The ends of the parts are formed to mate with each other. See FIGS. 7 and 8 where overlapping enlargement 28, part 26, mates with end 30 of part 20. This meeting is typical of all the ends of the parts. The parts are mated together, secured on mandrel 32 with fasteners 34, the mandrel rotated and a graphite filament 36 wound around the outer periphery of the window frame and built up into a reinforcing film 38. The filament is distributed from a dispenser 40 mounted to move back and forth on a monorail 42. The filament may have a coating of resin, or a resin may be applied to the built-up film. The parts when combined have a diamond-shaped window opening 44. All of the parts have a flange 46 that is tapered inwardly toward the window opening, and all have a pair of legs 48 and 50 that extend outward in a U shape. These legs have recesses 52 and 54 that are sized to accept and mate with ends of a cover plate 56. That cover plate is placed into the ends of the U-shaped legs and a layer of reinforcing filaments 58 in a resin is laid up on the outer surface. On the leg 50, which is furthest from the inwardly directed flange 46, there are a series of reinforcements 60.

The formed window frames 12 are spaced apart and placed in a line. Honeycomb core 14 is placed between and around the window frames. This honeycomb may be prepared from any of the known honeycomb materials, with a nonmetallic material preferred. A reinforced plastic outer cover 18 and inner cover 16 enclose the window frames 12 and the core material 14 and the lay-up is cured into the composite structure window belt. These covers may be prepared from any of the known reinforced plastics, with graphite filaments impregnated with an epoxy resin preferred. After the window belt is formed, the inner reinforced plastic cover is cut away or each window frame along the line 62, and the outer reinforced plastic cover is cut away along the line 64 to expose the window opening. However, it is preferred to wait until after the window belt is installed into a composite structure with a covering fiber reinforced inner layer 63 and fiber reinforced outer layer 65, as in FIG. 9, and all the layers cut away at 62 and 64 at the same time. FIG. 9 shows a typical window mounting in the window frame with window panes 66 and 68 held in spaced relation to each other with a shaped resilient insert 70. The insert is located to position the outer surface 72 of window pane 66 to follow the contour of the outer surface of the reinforcing cover 65. The window panes and the insert are held in position by a formed clip 72 that is secured to the window frames with a series of fasteners 74 that screw into the reinforcements 60 in the window frame. A spring clip 76 snaps over projection 78 of the formed clip and positions and holds a transparent sheet 80 in the window opening.

FIGS. 11 through 13 show a different embodiment of a window frame 12A for making up a composite structure window belt. In this window frame the frame is formed in one piece. This frame has an essentially diamond-shaped opening and has a modified Z-shaped cross section with flange 82 extending inward into the window opening at the outer side of the frame and an outwardly extending flange 84 at the inner side of the frame. A series of reinforcements 86 on the under side of the outwardly extending flange are used to accept a fastener for mounting a window to the window frame.

The cross section of the frame is thickened at top and bottom 88 to add strength. To make up the window belt when using this embodiment, inner reinforcing plastic cover 16A and outer reinforced plastic cover 18A extend over core 14A and the window frames.

FIG. 10 shows a preferred method of forming a window belt by passing the lay-up through a microwave curing applicator 90 which has a set of internal dies 92. First, a layer of graphite filaments impregnated with an epoxy resin is laid down. Formed window frames 12 are then laid up and surrounded with nonmetallic honeycomb core 14. A layer of graphite filaments impregnated with an epoxy resin is laid over the core with frames and advanced through the microwave applicator to cure the lay-up and continuously form a composite structure window belt.

I claim:

1. A window containing section of a composite structure for fuselage comprising: a row of spaced-apart reinforced plastic window frames, means on the window frames for securing windows within the frames, a layer of reinforcing filaments coated with a resin wound around a periphery of each window frame, a core of honeycomb extending between window frames, a reinforcing filament wound resin impregnated inner shell, and a reinforcing filament wound resin impregnated outer shell to make up a shaped composite structural section.

2. A window containing section of a composite structure as in claim 1 wherein the window frames are in sections to be joined by the filaments encircling the periphery.

3. A window containing section of a composite structure as in claim 2, further comprising: the window frames having laterally outwardly extending U-shaped legs, a reinforced plastic cover to mate with the ends of the legs, and a layer of reinforcing filaments coated with a resin wound around the periphery of the mating plastic cover.

4. A window containing section of a composite structure as in claim 1 wherein the window frames are each of a one-piece, essentially Z-shaped construction.

5. An elongated section of a composite structure containing windows, with the structure comprising: a series of spaced-apart, essentially diamond-shaped window frames each made up of parts of reinforced plastic, mating connections where the parts join, laterally outward extending U-shaped legs, a tapered flange to extend interally inward, a layer of reinforcing filaments coated with a resin wound around the outer periphery of the joined parts, a series of reinforcing enlargements to accept a fastener for retaining a window in the frame with the enlargements located along the inner side of the leg that is furthest from the flange, a cover plate of reinforced plastic to extend between the ends of the legs, and a layer of reinforcing filaments coated with a resin wound around the outside of the cover plate; a honeycomb core to extend between and around the window frames; a reinforcing filament wound resin impregnated inner shell; and a reinforcing filament wound resin impregnated outer shell with all the components making up an elongated section of a composite structure containing spaced-apart windows.

6. An elongated section of a composite structure containing windows, with the structure comprising; a series of spaced-apart, essentially diamond-shaped window frames each made up of reinforced plastic and having a modified Z-shaped cross section; a series of reinforcing enlargements to accept a fastener for joining a window to the frame with the enlargement located along the inner side of an outer leg of the modified Z-shape; a honeycomb core to extend between and around the window frames; a reinforcing filament wound resin impregnated inner shell; and a reinforcing filament wound resin impregnated outer shell with the components making up an elongated section of a composite structure containing windows.

7. An elongated section of a composite structure containing windows as in claim 6, further comprising: a layer of reinforcing filaments coated with a resin wound around the outer side of each window frame.

* * * * *